Patented May 5, 1936

2,039,571

UNITED STATES PATENT OFFICE 2,039,571

DYESTUFFS OF THE TRIARYLMETHANE SERIES

Ottmar Wahl, Leverkusen-I. G. Werk, Ernst Teupel, Leverkusen - Wiesdorf, and Karl Schmidt, Cologne-Mulheim, Germany, assignors to General Aniline Works, Inc., New York, N. Y., a corporation of Delaware No Drawing. Application May 23, 1934, Serial No. 727,200. In Germany June 3, 1933

8 Claims. (Cl. 260—67)

The present invention relates to new dyestuffs of the triarylmethane series, more particularly it relates to dyestuffs of the general formula:

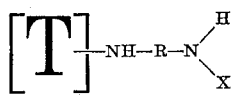

wherein T stands for the radical of a dyestuff of the triarylmethane series containing at least one sulfonic acid group, the group

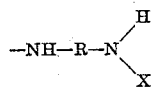

being attached to an aromatic nucleus in $p$-position to the carbinol C-atom, R stands for an arylene radical, $x$ stands for hydrogen or an acyl group, such as acetyl or benzoyl, and the groups

standing in $o$- or $p$-position to each other.

Our new dyestuffs are obtainable by starting with such dyestuffs of the triarylmethane series as contain a replaceable atom or group in $p$-position to the carbinol C-atom, for instance, a halogen atom, an alkoxy group, the sulfonic acid group or the nitro group, and reacting upon the same with an $o$- or $p$-arylenediamine. These dyestuffs of the above-identified formula, in which $x$ stands for an acyl group, are obtainable by acylating the dyestuffs obtained in accordance with the above described process, those containing the acylamino group in $p$-position also being obtainable in one step by performing the condensation with a mono-acyl-$p$-arylenediamine.

Our new dyestuffs are in form of their alkali metal salts generally dark, lustrous powders, dyeing the animal fibre generally greenish-blue to reddish-violet shades of good fastness to light and dischargeability.

The invention is illustrated by the following examples, without being limited thereto:

Example 1

300 parts by weight of the dyestuff of the following formula:

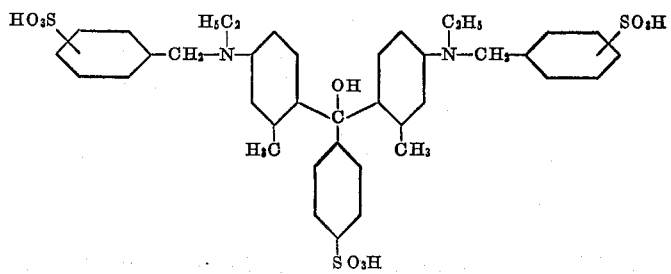

are heated at 100° C. with 400 parts by weight of $o$-phenylenediamine, until the green dyestuff has disappeared. The blue dyestuff which is obtained after separating the excess diamine and which corresponds in the carbinol form in the free state to the following formula:

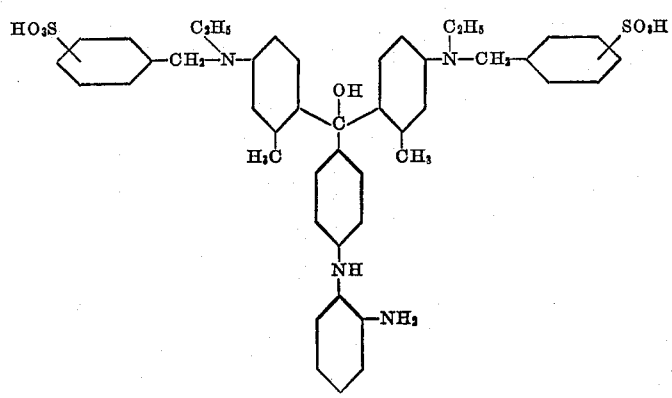

dyes wool and silk clear blue shades; the dyeings on silk can be discharged to a pure white.

The dyestuff obtained in accordance with paragraph 1 is stirred in the cold for 3 hours with acetic anhydride. The excess acetic anhydride is decomposed with water, and the dyestuff obtained having in the free state the following formula:

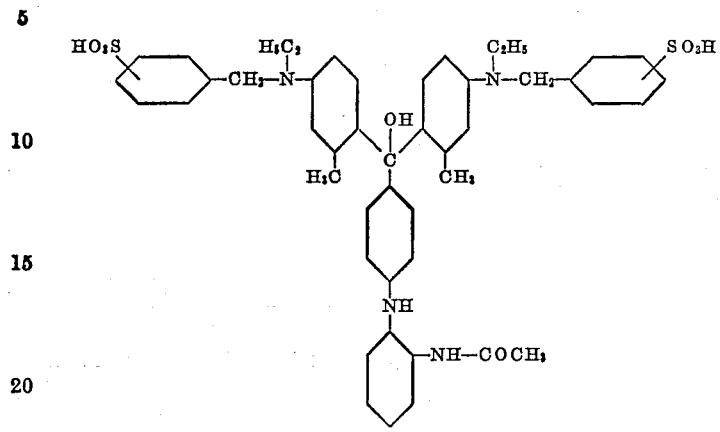

dyes wool and silk more greenish shades.

*Example 2*

300 parts by weight of the starting dyestuff of Example 1 are molten together with 400 parts by weight of p-phenylenediamine, as described in Example 1. A dyestuff, dyeing wool and silk more greenish-blue shades and exerting otherwise the same properties is thus obtained. In its free state the dyestuff corresponds to the following formula:

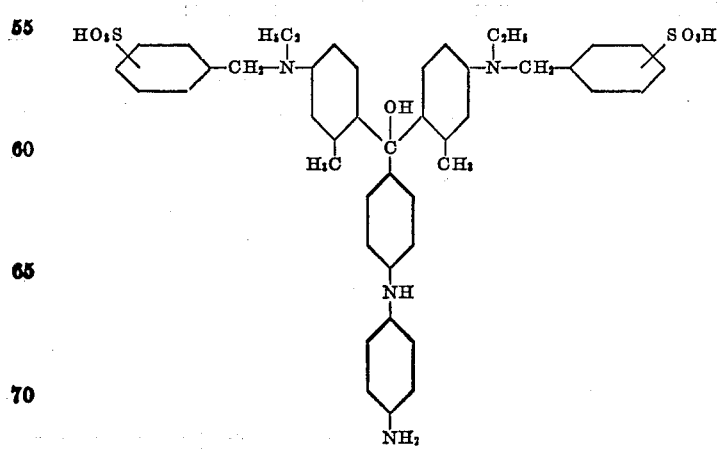

*Example 3*

300 parts by weight of the starting dyestuff of Example 1 are molten together with 400 parts by weight of monoacetyl-p-phenylenediamine, as described in Example 1. The dyestuff thus obtained having in the free state in the carbinol form the following formula:

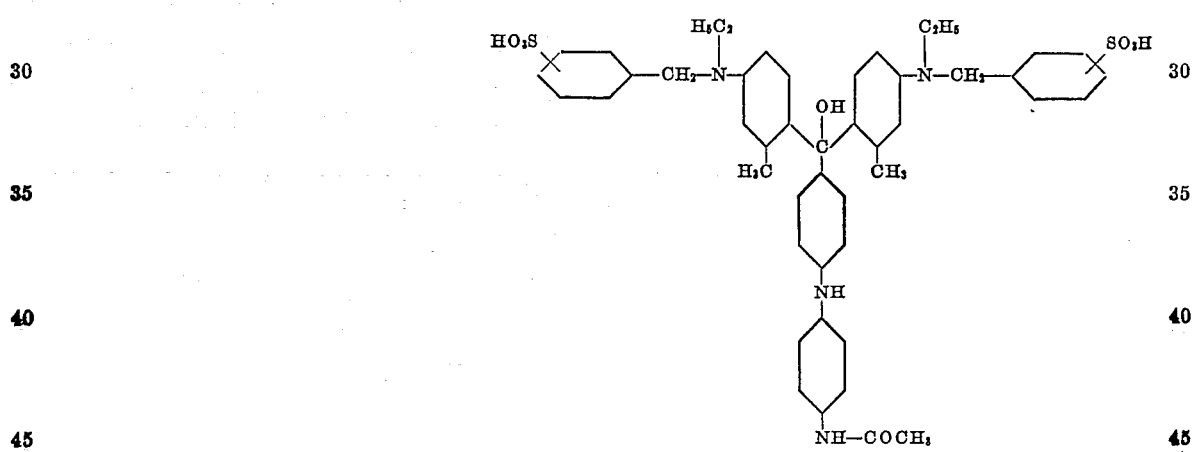

has properties similar to those of the dyestuff obtained in accordance with Example 2.

By substituting the mono-acetyl-p-phenylenediamine by an equivalent quantity of monobenzoyl-p-phenylenediamine, a dyestuff having similar properties is obtained.

Example 4

300 parts by weight of the starting dyestuff of Example 1 are molten together with 400 parts by weight of 1,2-diamino-4-ethoxybenzene; the dyestuff thus obtained having in the carbinol form in the free state the following formula:

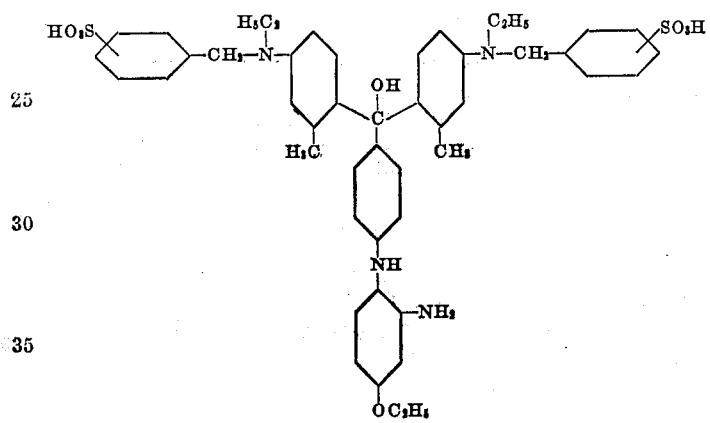

has the same properties as the dyestuff obtained in accordance with Example 1.

Example 5

300 parts by weight of the dyestuff corresponding to the following formula:

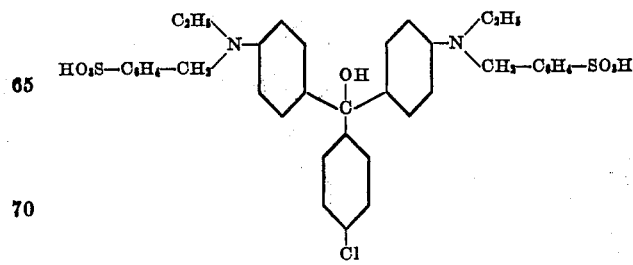

are heated at 100° C. with 400 parts by weight of p-phenylenediamine, until the blue dyestuff has disappeared. The dyestuff which is obtained after separating the excess p-phenylenediamine, and which corresponds in the free state in the carbinol form to the following formula:

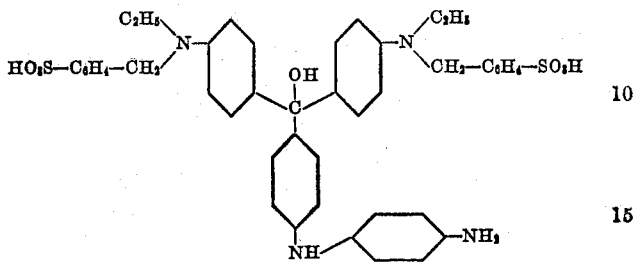

dyes wool and silk clear blue shades; the dyeings on silk can be discharged to a pure white.

Example 6

300 parts by weight of the dyestuff having the following formula:

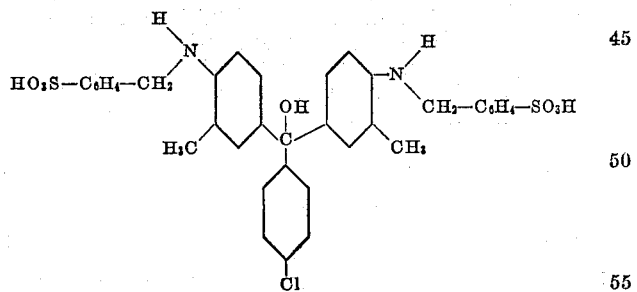

are heated at 100° C. with 400 parts by weight of o-phenylenediamine, until the green dyestuff has disappeared. The dyestuff purified dyes wool and silk violet shades of good fastness to light and dischargeability. In the carbinol form the dyestuff corresponds in the free state to the following formula:

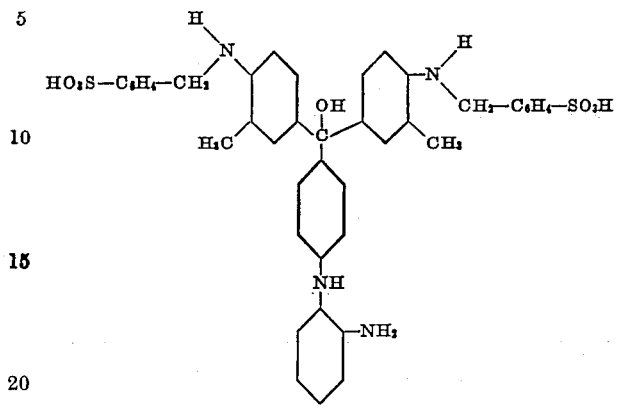

fonated dyestuff exerts otherwise the same properties.

Example 7

300 parts by weight of the dyestuff having the following formula:

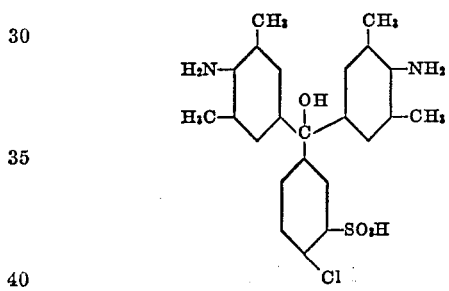

are heated at 100° C. with 400 parts by weight of o-phenylene-diamine, until the bluish-green dyestuff has disappeared. The dyestuff which is obtained after separating the excess diamine having in the carbinol form in the free state the following formula:

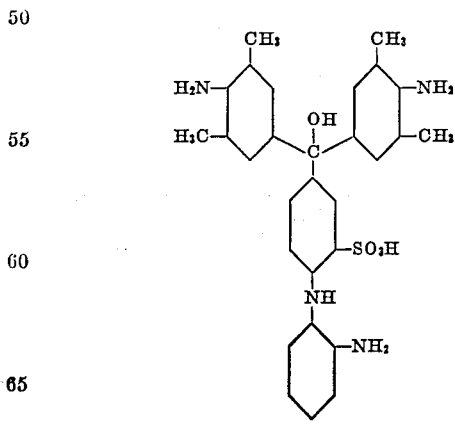

dyes wool and silk clear, reddish-violet shades of good fastness to light and dischargeability.

By after-treating the dyestuff with a sulfonating agent, such as concentrated sulfuric acid, a sulfonic acid group enters the phenyl nucleus of the phenylenediamine radical, thereby rendering the dyestuff more easily soluble; this sul- A bluish-violet dyestuff is obtained by melting the dyestuff of this example with p-phenylenediamine sodium sulfonate. In the carbinol form the dyestuff corresponds in the free state to the following formula:

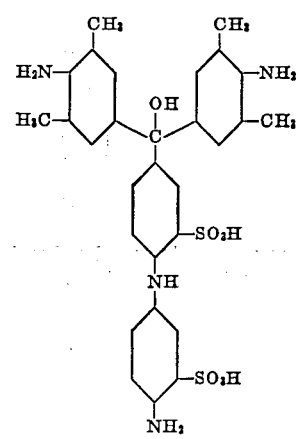

By melting together the starting dyestuff of this example with 1,2-diaminobenzene-4-carboxylic acid, there is obtained a dyestuff having in the carbinol form in the free state the following formula:

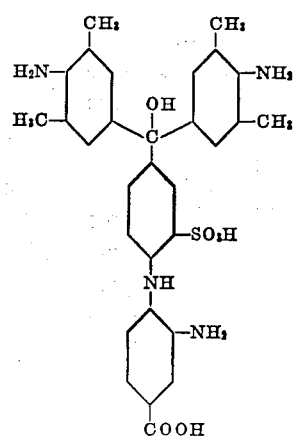

dyeing wool and silk clear reddish-violet shades.

By melting together the starting dyestuff of this example with 1,2-diaminonaphthalene-5-sulfonic acid, there is obtained a dyestuff having in the carbinol form in the free state the following formula:

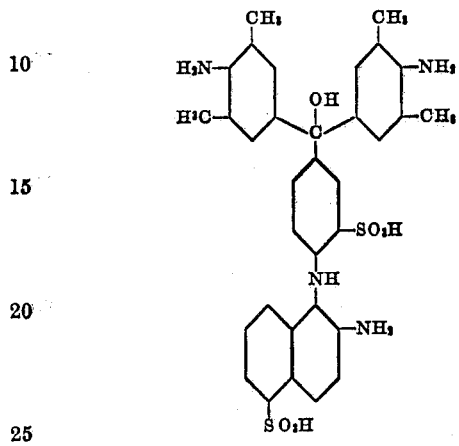

dyeing wool and silk clear reddish-violet shades.

By melting together the starting dyestuff of this example with 1.4-naphthylenediamine and sulfonating the product, there is obtained a dyestuff having in the carbinol form in the free state the following formula:

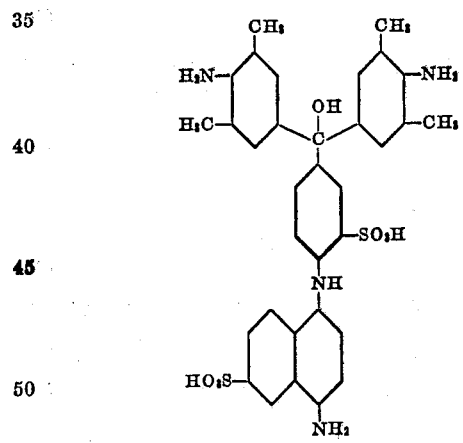

dyeing wool and silk clear violet shades.

*Example 8*

300 parts by weight of the dyestuff of the following formula:

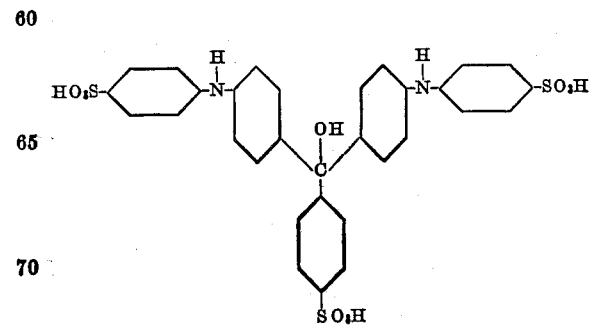

are heated at 100° C. with 400 parts by weight of o-phenylenediamine, until the greenish-blue dyestuff has disappeared. The blue dyestuff which is obtained after separating the excess diamine and which corresponds in the carbinol form in the free state to the following formula:

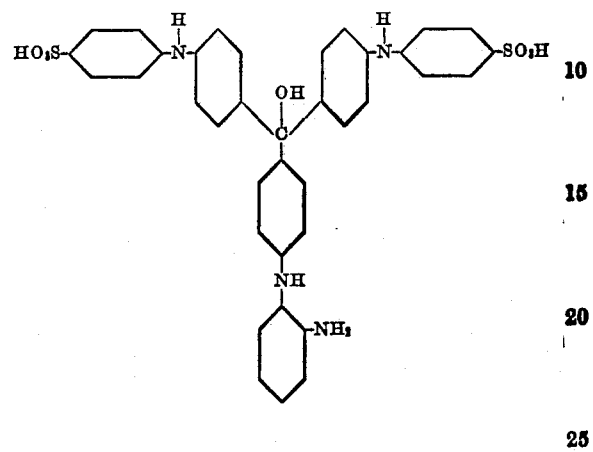

dyes wool and silk clear blue shades; the dyeings on silk can be discharged to a pure white.

We claim:

1. Triarylmethane dyestuffs of the general formula:

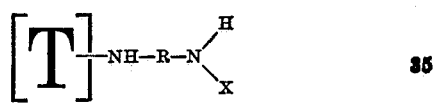

wherein T stands for the radical of a dyestuff of the diamino triarylmethane series containing at least one sulfonic acid group, the group

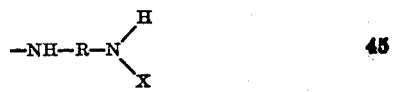

being attached to an aromatic nucleus in $p$-position to the carbinol C-atom, R stands for an arylene radical, $x$ stands for hydrogen or an acyl group, and the groups

stand in $o$- or $p$-position to each other, dyeing the animal fibre generally greenish-blue to reddish-violet shades of good fastness to light and dischargeability.

2. Triarylmethane dyestuffs of the general formula:

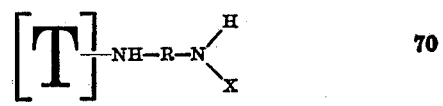

wherein T stands for the radical of a dyestuff of the diamino triarylmethane series containing at least one sulfonic acid group, the group

being attached to an aromatic nucleus in p-position to the carbinol C-atom, R stands for an arylene radical of the benzene or naphthalene series, x stands for hydrogen, an acetyl group or benzoyl group, and the groups

stand in o- or p-position to each other, dyeing the animal fibre generally greenish-blue to reddish-violet shades of good fastness to light and dischargeability.

3. Triarylmethane dyestuffs of the general formula:

wherein T stands for the radical of a dyestuff of the diamino triphenylmethane series containing at least one sulfonic acid group, the group

being attached to a benzene nucleus in p-position to the carbinol C-atom, R stands for an arylene radical, x stands for hydrogen or an acyl group, and the groups

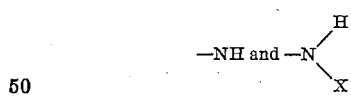

stand in o- or p-position to each other, dyeing the animal fibre generally greenish-blue to reddish-violet shades of good fastness to light and dischargeability.

4. Triarylmethane dyestuffs of the general formula:

wherein T stands for the radical of a dyestuff of the diamino triphenylmethane series containing at least one sulfonic acid group, the group

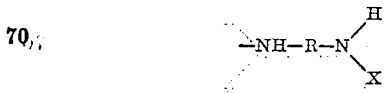

being attached to a benzene nucleus in p-position to the carbinol C-atom, R stands for an arylene radical of the benzene or naphthalene series, x stands for hydrogen, an acetyl group or benzoyl group, and the groups

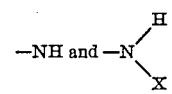

stand in o- or p-position to each other, dyeing the animal fibre generally greenish-blue to reddish-violet shades of good fastness to light and dischargeability.

5. Triarylmethane dyestuffs having in the carbinol form the following general formula:

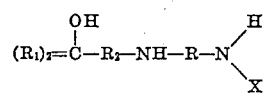

wherein $R_1$ and $R_2$ stand for radicals of the benzene series, $R_1$ bearing in p-position to the carbinol C-atom an amino group, the hydrogen atoms of which may be substituted by substituents selected from the group consisting of alkyl, aralkyl and aryl, R stands for an arylene radical of the benzene or naphthalene series, the group

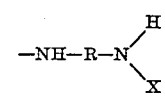

being attached to $R_2$ in p-position to the carbonol C-atom, x stands for hydrogen or an acyl group, the groups

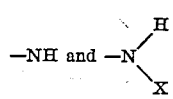

standing in o- or p-position to each other, and wherein the molecule contains at least one sulfonic acid group, dyeing the animal fibre generally greenish-blue to reddish-violet shades of good fastness to light and dischargeability.

6. The dyestuff having in the carbinol form in the free state the following formula:

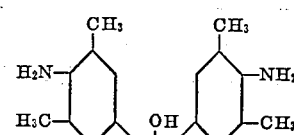
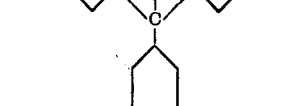
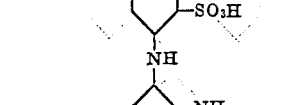

dyeing wool and silk clear reddish-violet shades of good fastness to light and dischargeability.

7. The dyestuff having in the carbinol form in the free state the following formula:

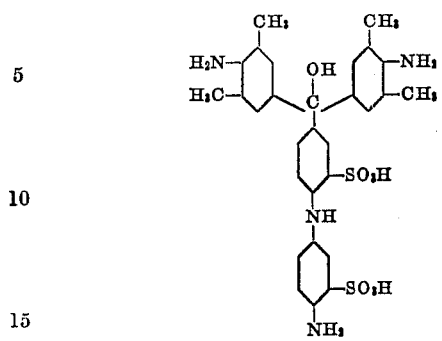

dyeing wool and silk bluish-violet shades of good fastness to light and dischargeability.

8. The dyestuff having in the carbinol form in the free state the following formula:

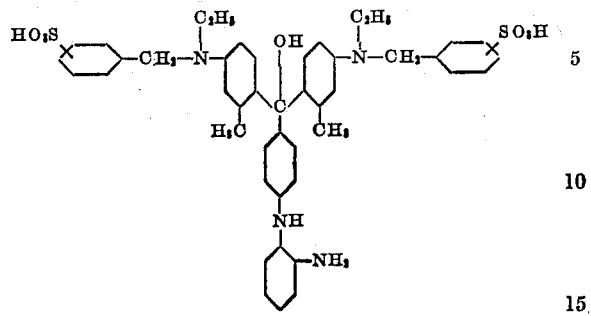

dyeing wool and silk clear blue shades of good fastness to light and dischargeability.

OTTMAR WAHL.
ERNST TEUPEL.
KARL SCHMIDT.